(12) United States Patent
Desjardins et al.

(10) Patent No.: US 9,829,119 B2
(45) Date of Patent: Nov. 28, 2017

(54) MONOLITHIC THERMOPLASTIC P-CLAMP WITH CUSHION AND LOCKING MECHANISM

(71) Applicant: Amphenol Corporation, Wallingford, CT (US)

(72) Inventors: Mathieu Desjardins, Montreal (CA); Dimitri Laflamme, Longueuil (CA); Frederic Wallman, Longueuil (CA); Rachid Ouallou, Chambly (CA); Jeremi Proulx, St.-Hubert (CA)

(73) Assignee: Amphenol Corporation, Wallingford, CT (US)

( * ) Notice: Subject to any disclaimer, the term of this patent is extended or adjusted under 35 U.S.C. 154(b) by 0 days.

(21) Appl. No.: 14/968,664

(22) Filed: Dec. 14, 2015

(65) Prior Publication Data

US 2017/0167635 A1    Jun. 15, 2017

(51) Int. Cl.
*H01B 17/00* (2006.01)
*F16L 3/137* (2006.01)
*F16L 3/233* (2006.01)

(52) U.S. Cl.
CPC ............... *F16L 3/137* (2013.01); *F16L 3/233* (2013.01)

(58) Field of Classification Search
CPC ... F16L 3/24; F16L 55/035; F16L 3/13; F16L 3/237; F16L 3/233; F16L 3/223; F16L 3/12; F16L 3/04; F16L 3/2235; F16L 3/137

USPC ............................. 248/74.1, 74.2, 74.3, 74.4
See application file for complete search history.

(56) References Cited

U.S. PATENT DOCUMENTS

| | | | |
|---|---|---|---|
| 1,782,266 A | 11/1930 | Harding | |
| 4,452,097 A * | 6/1984 | Sunkel | E05F 11/405 285/406 |
| 7,216,862 B2 | 5/2007 | Walsh | |
| 7,300,078 B2 * | 11/2007 | Yamamoto | F16L 37/1225 285/364 |
| 8,231,147 B2 * | 7/2012 | Link | F16L 33/035 24/16 PB |
| 8,328,457 B2 * | 12/2012 | Werth | A61M 39/1011 24/16 R |
| 8,759,682 B2 | 6/2014 | Devouge | |

\* cited by examiner

*Primary Examiner* — Steven Marsh
(74) *Attorney, Agent, or Firm* — Blank Rome LLP

(57) ABSTRACT

A securing device for mechanical components that is comprised of the securing device is designed as a longitudinal plastic strip comprised of a first complementary tab and a second complementary tab. The first complementary tab and the second complementary tab interlock together and rest flush against one another in a manner that lines up the hole of the first complementary tab with the hole of the second complementary tab. The securing device may be surrounded by a cushion to improve the securing functionality of the device.

10 Claims, 2 Drawing Sheets

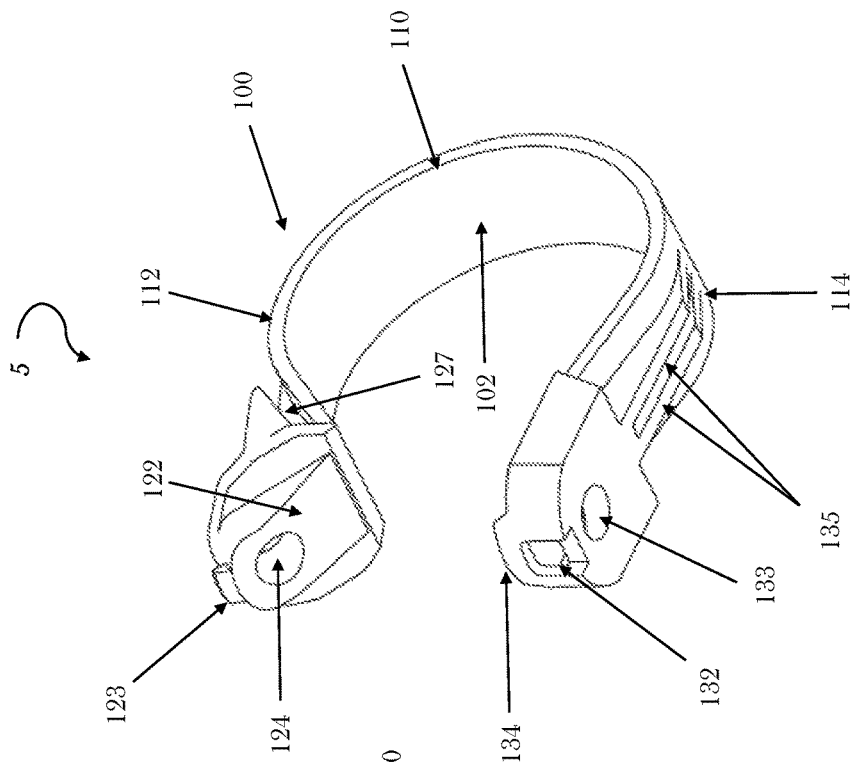
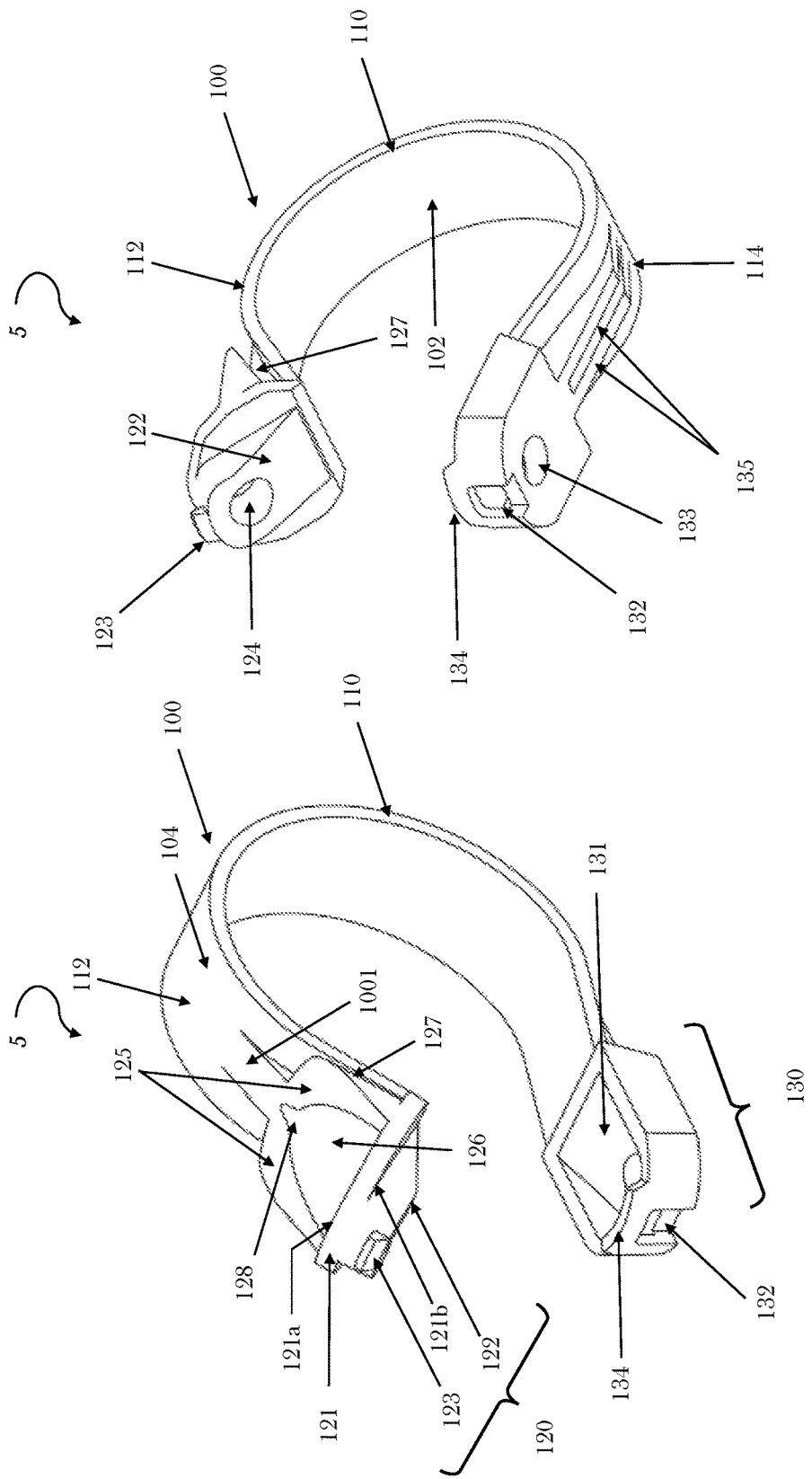

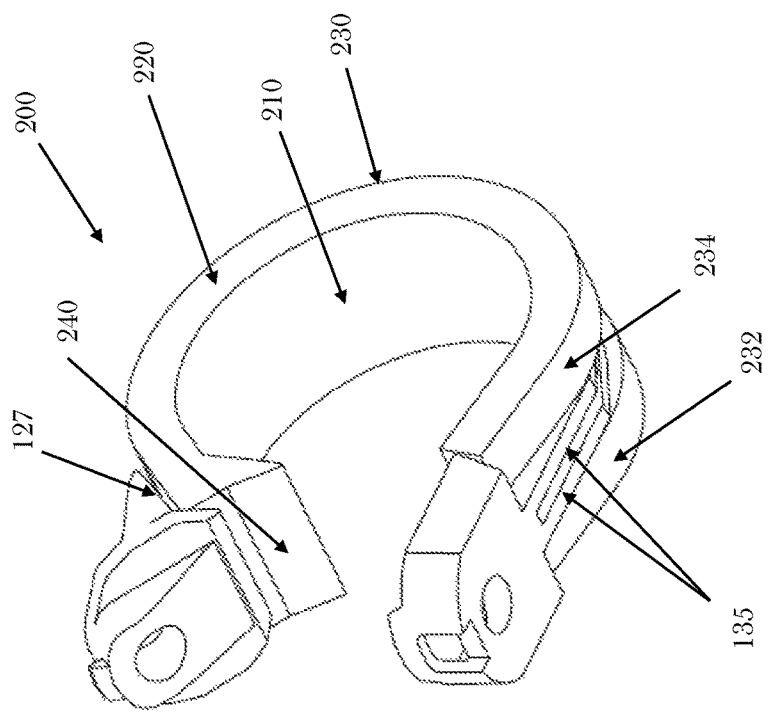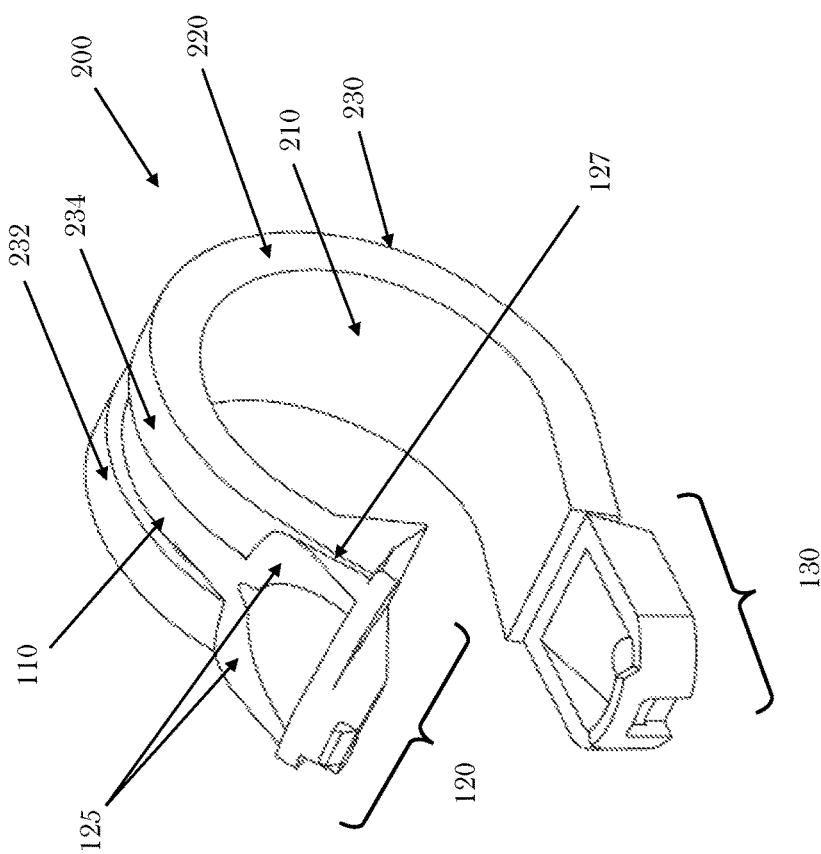

MONOLITHIC THERMOPLASTIC P-CLAMP WITH CUSHION AND LOCKING MECHANISM

FIELD OF THE INVENTION

The present invention relates to the field of fastening devices, and especially a clamp. More particularly, the present invention relates to a p-clamp to support and/or retain such mechanical components as wire bundles, tubing, piping or other equipment requiring a substantially circular clamp.

BACKGROUND OF THE INVENTION

The p-clamp is a mechanical apparatus used in the art to secure components. More particularly, the p-clamp is used to hold or tightly secure two or more objects together, in order to prevent their movement or separation by application of an inward force. As shown, for example, in U.S. Pat. Nos. 1,782,266 and 7,216,862, p-clamps are generally designed as a metal clamp produced from a single long metal piece. The single metal piece is bent into a form comprised of a circular arc, with the opposite ends of the metal piece coming together to close the circular arc. The end pieces of the clamp are fastened together using a screw or bolt.

Existing p-clamps are metal, or metal covered by a plasticized or rubberized component for improved grip. While sturdy, metal clamps are difficult to bend to fit around one or more longitudinal elements, like bundles of wires, tubing, or other similar materials.

Consequently, there is a need for a p-clamp that is lighter and more flexible than metal, but still capable of providing a strong and reliable inward force and circumferential grip around components to be secured. There is also a need for a p-clamp with a modular covering for improved grip, so that a damaged covering can be replaced without requiring disposal of the p-clamp itself. Such p-clamps with a modular covering may also allow for easy replacement of cushion material or easy changes to geometry, such that each p-clamp offers multiple options for a user.

SUMMARY OF THE INVENTION

It is therefore an object of the exemplary embodiments disclosed herein to alleviate the disadvantages in the art and provide a p-clamp that is molded from a combination of plastic and rubber components in order to provide a lightweight but sturdy circumferential clamping device.

In one aspect of the invention, the securing device is designed as a longitudinal plastic strip comprised of a top leg and a bottom leg. In that design, the top leg terminates in an first complementary tab, while the bottom leg terminates in a second complementary tab. The first complementary tab is comprised of a depression, a locking support, a latch, and a hole. The second complementary tab is comprised of one or more raised ribs, a ramp, an optional lip, and a hole. The first complementary tab and the second complementary tab interlock together and rest flush against one another in a manner that lines up the hole of the first complementary tab with the hole of the second complementary tab.

In other aspects of the invention, the securing device is surrounded by a cushion. The cushion may be made up of a latex polymer or elastomer, a synthetic polymer, or any combination thereof. In yet other aspects of the invention, the internal face of the cushion is ribbed or grooved in order to compress more easily, form a better grip, and/or accommodate multiple diameters of mechanical components. In yet other aspects of the invention, the holes through the first and second complementary tabs are threaded to allow for better fastening using a screw. Other aspects of the invention also include a cushion that additionally has a ramp that sits flush against the interior surface of the opposite side of the cushion when the securing device is interlocked.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein:

FIGS. 1A and 1B show isometric views of an exemplary embodiment of the securing device; and FIGS. 2A and 2B show isometric views of an exemplary embodiment of the securing device that includes a cushion.

DETAILED DESCRIPTION OF PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

FIGS. 1A and 1B shows different isometric views of a fastening device 5 in accordance with an exemplary embodiment of the invention. The fastening device 5 is a p-clamp having an elongated plastic body 100, which has an inner face 102 and an outer face 104. The elongated plastic body 100 is further comprised of a curved body portion 110, an first complementary tab assembly or portion 120, and a second complementary tab assembly or portion 130. The elongated plastic strip 100 may be molded from any plastic known in the art as long as the material is flexible enough to allow the curved body portion 110 to flex to permit the first complementary tab assembly 120 to separate from the second complementary tab assembly 130 to receive objects therebetween, and also for the complementary tab assembly 120 to come together and interlock with the second complementary tab assembly 130 without deforming permanently. Exemplary types of plastic used may be polyethylene, polypropylene, polyvinyls, malemides, polyamide, polyaryletherketone and various plasticized combinations of such materials. The plastics used in the elongated plastic strip 100 are advantageous over metallic securing devices because they are lighter, easier to install, easier to bend, and retain equivalent securing strength.

The curved body portion 110 is further comprised of a first end top portion 112, and a second end bottom portion 114 opposite the first end top portion 112. The top portion 112 is operably attached to the first complementary tab assembly 120. The bottom portion 114 is operably attached to the second complementary tab assembly 130. The top portion 112 and the bottom portion 114 of the curved body portion 110 may be integrally formed with the first complementary tab assembly 120 and the lower tab assembly 130, respectively. The first complementary tab assembly 120 and the lower tab assembly 130 may also be separate and attached to the top portion 112 and the bottom portion 114.

The first complementary tab assembly 120 is comprised of a platform 121 with a top surface 121a and a bottom surface 121b. The first complementary tab assembly 120 is further comprised of a platform locking support 122, a latch 123, a hole 124 drilled, machined, or molded through the first complementary tab assembly 120, a bracket 125, a depression 126, a channel 127, and a cutout or sink mark 128. The locking support 122 preferably projects outward and downward from the bottom surface 121b of the platform 121 of the first complementary tab assembly 120. In certain embodiments, the locking support 122 is trapezoidal from a side view and may appear to have a wedge-like shape. Alternate embodiments may have a locking support 122 shaped like a rectangle or a parallelogram. The locking support 122 has a front portion that terminates in a latch 123 that juts forward and outward from the front of the locking support 122, and also has a rear portion that is angled.

A hole 124 is drilled, machined, or molded through the platform 121 and the center of the locking support 122. The hole 124 is designed to accommodate a screw, bolt, or other fastener. The hole 124 may further be threaded, or may incorporate a captive fastener for more effective fastening. It will be readily apparent to one of ordinary skill in the art that the hole 124 may be of any shape that can accommodate a fastening device such as a screw or bolt. The hole 124 may be of a variable diameter, depending on the type of fastener used.

The first complementary tab assembly 120 may have a raised bracket 125 that is aligned with the top portion 112 of the curved body 110. The bracket 125 provides additional structural support at a point of stress for the curved body 110. The front of the raised bracket 125 has two arms that come forward on the platform 121 and form a depression 126 in the curved body 110. This depression 126 is preferably molded in a substantially semi-circular shape that is suited to receive a fastener head and also to fit the fingertip of an individual pressing against it to bring the first complementary tab assembly 120 and the second complementary tab assembly 130 together, and to allow the latch 123 to lock the tab assemblies 120, 130 together. The semi-circular shape of the depression 126 may also grant the additional advantage of allowing multiple fastening devices 5 to be stacked atop one another. Exemplarily, the second tab assembly 130 of a first fastening device 5 may sit upon the first complementary tab assembly 120 of a second fastening device 5, such that a common fastener may pass through the holes of both tab assemblies.

The bracket 125 arms are tapered so that they are taller at the rear and shorter at the front of the platform 121. The rear face of the arms are parallel to and face the outer surface 104 of the curved body portion 110 and together form a longitudinal channel 127 between the first complementary tab assembly 120 and the top portion 112 of the curved body portion 110. The first complementary tab assembly 120 includes a center support 1001 substantially at the center of the depression 126 and the width of the curved body portion 110. The center support 1001 joins the bracket 125 to the top portion 112 of the curved body portion 110, such that the longitudinal channels 127 is on either side of the center support 1001. The channels 127 are designed to accommodate an additional cushion, as described further in FIGS. 2A and 2B. A cutout or sink mark 128 may be present above the depression 126 in order to maintain overall constant material thickness of the bracket 125 and the center support 1001. In alternate embodiments, the center support 1001 may be split so that it forms two distinct supports above the bracket 125.

At the other end of the curved body portion 110 is the second complementary tab assembly 130. The second complementary tab 130 is further comprised of an internal ramp 131, a notch 132, a hole 133, an optional lip 134, and one or more raised ribs 135. The second complementary tab assembly 130 is preferably designed to be complementary in shape to the locking support 122 to have a ramp 131 and a flat section. Accordingly, the ramp 131 is angled downward toward the front of the second complementary tab assembly 130 to form a receiving space. The locking support 122 slides along the ramp 131 as the first complementary tab assembly 120 is brought into contact with the second complementary tab assembly 130. The notch 132 is preferably at the distal end of the ramp 131. When the first complementary tab assembly 120 and the second complementary tab assembly 130 are brought together, the latch 123 slides into the notch 132, such that, when the first complementary tab assembly 120 and the second complementary tab assembly 130 are fully engaged, the tab assemblies 120, 130 are in an interlocked configuration, flush against one another. The latch 123 engages the notch 132 to cooperatively hold the tab assemblies 120, 130 together against the outward bias of the curved body portion 110.

Another advantage resulting from the latch 123 sliding into the notch 132 is that the hole 133 of the second complementary tab assembly 130 and the hole 124 of the first complementary tab assembly 120 are automatically aligned, allowing for the insertion of the screw, bolt, or other fastener used to more permanently secure the device. The second complementary tab assembly 130 may also have a lip 134 that projects upward from the second complementary tab assembly 130. When the tab assemblies 120, 130 rest in an interlocked configuration, the lip 134 extends over the front of the first complementary tab assembly 120. The lip 134 serves as a guide for the latch 123, directing it into the notch 132 of the second complementary tab assembly 130. The raised ribs 135 are designed to support the frame of the curved body portion 110, thereby increasing the structural integrity of the curved body portion 110 when it is bent to interlock the first complementary tab assembly 120 with the second complementary tab assembly 130. The raised ribs 135 extend longitudinally along the outer surface 104 at the bottom portion 114 to provide support to that portion of the curved body portion 110. The raised ribs 135 are also designed to function as guides for embodiments of the invention that incorporate a cushion, as exemplarily described in FIGS. 2A and 2B.

When the first and second complementary tab assemblies 120, 130 are in an interlocked configuration, the hole 124 of the first complementary tab assembly 120 lines up with the hole 133 of the second complementary tab assembly 130. When the holes 124, 133 are lined up, a preferably cylindrical opening is created through the first and second complementary tabs 120, 130. The interior of the holes 124, 133 may be threaded or otherwise scored to better accommodate a screw, bolt, or other fastener, which may be used with the securing device to more permanently lock the first and second complementary tab assemblies 120, 130 together around at least one longitudinal element.

FIGS. 2A and 2B show isometric views of an exemplary embodiment of the securing device that includes a cushion 200. In this exemplary embodiment, the cushion 200 surrounds the elongated plastic body 100. The cushion 200 is preferably more particularly designed to surround the curved body portion 110, while leaving the first complementary tab 120 and the second complementary tab 130 exposed. When the first and second complementary tab assemblies 120, 130 are in an interlocked configuration, the elongated plastic strip 100 forms a closed circular space where the inner face 102 grips objects along their longitudinal axes, and the cushion 200 further grips objects to reliably retain those objects. An advantage of the cushion 200 used in this exemplary embodiment is that the cushion 200 is modular because it is molded to standard specifications. Thus, the cushion 200 does not need to be uniquely overmolded or bonded on top of the longitudinal plastic strip 100.

The cushion 200 is elongated and comprised of an interior face 210, a two side faces 220, an exterior portion 230 that has a left exterior portion 232 and a right exterior portion 234 with a gap between the left and right exterior portions 232, 234, and a heel 240. The interior face 210 of the cushion, which contacts the at least one longitudinal element being secured, may be ribbed or grooved in order to compress more easily, form a better grip, and/or accommodate multiple diameters of mechanical components when the first and second complementary tabs 120, 130 are in an interlocked configuration. The exterior portion 230 of the cushion 200 covers the inner face 102, while the two side faces 220 wrap around the elongated plastic body 100 to partly cover the outer face 104.

When the cushion 200 is fitted around the curved body 110 of the longitudinal plastic strip 100, the left exterior face 232 and the right exterior face 234 slide into the respective channels 127 between the outer face 104 of the elongated plastic body 100 and the bracket 125. On the opposite side, the raised ribs 135 fit in the space between the left exterior face 232 and the right exterior face 234, while serving to guide each side of the cushion 200 against the second complementary tab assembly 130. The left exterior face 232 and the right exterior face 234 are sufficiently wide to stay in place on the curved body portion 110.

An additional feature of the exemplary embodiment may be the heel 240 of the cushion 200. When the first and second complementary tabs 120, 130 are in an interlocked configuration, the heel 240 is designed to rest flush against the interior face 210 of the cushion, which is adjacent to the second complementary tab 130. The heel 240 is designed to provide additional structural support to the longitudinal plastic strip 100, resulting in a more secure grip and improved clamping of the one or more longitudinal elements. The heel 240 is preferably curved to form a smooth fit between the cushion 200 at the bracket 125 and the raised ribs 135 at the first and second complementary tab assemblies 120, 130, respectively.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A device for securing at least one element comprising:
   an elongated plastic body having a curved body portion with a first end and a second end opposite the first end;
   a first complementary tab assembly at the first end of said elongated plastic body, said first complementary tab assembly having a platform projecting outward from the first end of said elongated plastic body and having a transverse front surface, a latch projecting outward from the front surface of said platform, and a first hole extending transversely through said platform; and
   a second complementary tab assembly at the second end of said elongated plastic body, said second complementary tab assembly having a depression forming a front wall and a bottom, a notch located in the front wall, and a second hole extending transversely through the bottom of said depression;
   wherein the latch of the first complementary tab assembly is received in and locks with the notch of the second complementary tab assembly, whereby the first hole is aligned with the second hole.

2. The device of claim 1, wherein the first complementary tab assembly and the second complementary tab assembly interlock and align the first hole with the second hole.

3. The device of claim 1, wherein said elongated plastic body has an interior surface and an exterior surface opposite the first interior surface, and further comprising one or more raised ribs at the exterior surface of the second end of said elongated plastic body, the raised ribs joining with the depression and extending substantially longitudinally along the elongated plastic body.

4. The device of claim 1, wherein said elongated plastic body has an interior surface and an exterior surface opposite the first interior surface, and further comprising cushion extending along the interior surface of said elongated plastic body and extending around sides of the elongated plastic body and at least partially extending along the exterior surface of said elongated plastic body.

5. The device of claim 4, wherein the cushion is comprised of: a latex polymer or elastomer, a synthetic polymer or elastomer, or any combination thereof.

6. The device of claim 4, wherein an internal face of the cushion is ribbed or grooved.

7. The device of claim 4, wherein the cushion has a heel adjacent to the first complementary tab assembly of the longitudinal plastic strip.

8. The device of claim 1, wherein the first hole of the first complementary tab assembly and the second hole of the second complementary tab assembly are threaded for the fastening of a screw.

9. The device of claim 4, wherein the cushion is further comprised of a ramp attached to the first complementary tab assembly.

10. The device of claim 1, further comprising a lock support extending downward from said platform, whereby the latch is positioned at a bottom front surface of said lock support, and whereby said lock support is received in the depression of said second complementary tab assembly.

* * * * *